United States Patent

Takano et al.

[11] Patent Number: 5,867,299
[45] Date of Patent: Feb. 2, 1999

[54] CASCADE SCANNING OPTICAL SYSTEM

[75] Inventors: Masatoshi Takano; Eiji Takasugi; Shinji Kikuchi; Tsutomu Sato; Hiroyuki Saito; Yoshiyuki Araki; Mitsunori Iima; Takashi Sasaki; Takashi Iizuka, all of Tokyo, Japan

[73] Assignee: Asahi Kogaku Kogyo Kabushiki Kaisha, Tokyo, Japan

[21] Appl. No.: 917,475

[22] Filed: Aug. 26, 1997

[30] Foreign Application Priority Data

Aug. 26, 1996 [JP] Japan ................................. 8-224083

[51] Int. Cl.⁶ .................................................. G02B 26/08
[52] U.S. Cl. .................... 359/201; 359/204; 359/206; 359/216; 347/243; 347/244
[58] Field of Search ..................... 359/201–206, 359/212–219; 347/233–235, 241–244

[56] References Cited

U.S. PATENT DOCUMENTS 5,461,414 10/1995 Honda .
5,654,817 8/1997 De Loor .................................. 359/201

FOREIGN PATENT DOCUMENTS 58-130672  8/1983  Japan .
58-158623  9/1983  Japan .
58-162926  9/1983  Japan .
60-28618   2/1985  Japan .
60-35712   2/1985  Japan .
60-57316   4/1985  Japan .
61-11720   1/1986  Japan .
61-42615   3/1986  Japan .
63-50809   3/1988  Japan .

OTHER PUBLICATIONS

Konica Technical Report vol. 9 (1996) together with an English Language translation.

*Primary Examiner*—James Phan
*Attorney, Agent, or Firm*—Greenblum & Bernstein, P.L.C.

[57] ABSTRACT

A cascade scanning optical system which includes a plurality of laser scanning optical systems each emitting a laser beam to scan a surface of a member, and a beam splitter positioned in an optical path between the plurality of laser scanning optical systems and the member such that a first laser beam which has passed through the beam splitter and a second laser beam which has been reflected by the beam splitter proceed to the surface on a common line thereon in respective ranges of the common line. Each of the plurality of laser scanning optical systems is desinged as a telecentric system.

8 Claims, 5 Drawing Sheets

CASCADE SCANNING OPTICAL SYSTEM

BACKGROUND OF THE INVENTION

1. Field of the Invention

The present invention relates to a cascade scanning optical system having a plurality of laser scanning optical systems which are arranged along the main scanning direction and controlled to operate in synchronization with each other so as to realize a wide scanning line.

2. Description of the Related Art

A cascade scanning optical system having a plurality of laser scanning optical systems arranged along the main scanning direction to realize a wide scanning line is known. Such a scanning optical system is disclosed in Japanese Laid-Open Patent Publication No. 61-11720, published on Jan. 20, 1986. This publication discloses a cascade scanning optical system having a pair of laser scanning optical systems each having a laser beam emitter, a polygon mirror serving as a deflecting device, an fθ lens, etc The pair of laser scanning optical systems are synchronously driven to emit respective scanning laser beams to a photoconductive surface (scanning surface) of a photoconductive drum on a common line thereon extending in parallel to the axial direction of the photoconductive drum. The pair of scanning laser beams respectively scan two adjacent ranges of the common line on the photoconductive surface so as to scan the photoconductive surface of the photoconductive drum in the main scanning direction in a wide range.

There is a fundamental problem to be overcome in such a cascade scanning optical system. Namely, how can a scanning line, made on the photoconductive drum by the scanning laser beam emitted from one laser scanning optical system of the cascade scanning optical system, be accurately combined with another scanning line, made on the photoconductive drum by the scanning laser beam emitted from another laser scanning optical system of the cascade scanning optical system, so as not to be apart from each other or overlap each other in either the main scanning direction or the sub-scanning direction, i.e., so as to form a straight and continuous scanning line using a combination of the separate scanning lines.

In the case where each laser scanning optical system of the cascade scanning optical system is designed as a non-telecentric system through which the incident angle of a scanning laser beam relative to the photoconductive surface of the photoconductive drum varies in accordance with a variation in the position of a scanning spot of the scanning laser beam on the photoconductive surface in the main scanning direction, a scanning line made through one laser scanning optical system will not be precisely combined with another scanning line made through another laser scanning optical system on the photoconductive surface of the photoconductive drum, i.e., those scanning lines will be apart from each other or overlap each other by a certain amount in the main scanning direction if the photoconductive surface deviates from its original position even by a slight amount.

In the case where each laser scanning optical system of the cascade scanning optical system is designed as a telecentric system through which the scanning laser beam of each laser scanning optical system is always incident on the photoconductive surface in a direction perpendicular to an axial direction of the photoconductive drum, specifically in a direction orthogonal to generatrices of the photoconductive drum, the aforementioned problem in the case of the non-telecentric system will not occur, but it is necessary for each laser scanning optical system to be arranged at different positions in the sub-scanning direction to differentiate the angles of respective laser beams relative to the photoconductive surface, in order to prevent the respective laser beams from interfering with each other. However, with such an arrangement, if the photoconductive surface deviates from its original position even by a slight amount, a scanning line made through one laser scanning optical system and another scanning line made through another laser scanning optical system on the photoconductive drum will deviate from each other in the sub-scanning direction, and accordingly the former and latter scanning lines will not be combined with each other in the main scanning direction, so that a wide scanning line made by a combination of those scanning lines which extend in the main scanning direction across the photoconductive surface of the drum cannot be formed.

SUMMARY OF THE INVENTION

The primary object of the present invention is to provide a cascade scanning optical system in which a scanning line made by the scanning laser beam emitted from one laser scanning optical system and another scanning line made by the scanning laser beam emitted by another laser scanning optical system will not deviate from each other in either the main or sub-scanning direction on the photoconductive surface of a photoconductive drum so as to form a straight and continuous wide scanning line by a combination of those scanning lines.

To achieve the object mentioned above, according to an aspect of the present invention, there is provided a cascade scanning optical system which includes a plurality of laser scanning optical systems each emitting a laser beam to scan a surface of a member, and a beam splitter positioned in an optical path between the plurality of laser scanning optical systems and the member such that a first laser beam which has passed through the beam splitter and a second laser beam which has been reflected by the beam splitter proceed to the surface on a common line thereon in respective ranges of the common line, wherein each of the plurality of laser scanning optical systems is a telecentric system. With this arrangement, even if the surface of the member deviates from its original position in a direction close to or away from the plurality of laser scanning optical systems, each of the first and second laser beams is maintained to be incident on the surface of the member in a direction perpendicular to the aforementioned common line thereon, so that the opposing ends of two scanning lines formed by the first and second scanning laser beams will not be apart from each other or overlap each other even if the surface of the member deviates from its original position in the direction close to or away from the plurality of laser scanning optical systems.

Preferably, the member is a drum having the aforementioned surface on a periphery of the drum, wherein the beam splitter is positioned in the optical path such that the first and second laser beams proceed to the surface on the common line thereon extending in an axial direction of the drum in the respective ranges of the common line, and wherein the first and second laser beams are incident on the surface in a direction perpendicular to the axial direction of the drum.

Preferably, the cascade scanning optical system further includes a mirror positioned adjacent to the beam splitter to reflect a laser beam emitted from one of the plurality of laser scanning optical systems towards one side of the beam splitter in a first direction, wherein another one of the plurality of laser scanning optical systems is positioned such that a laser beam emitted therefrom towards another side of the beam splitter in a second direction perpendicular to the first direction.

Preferably, the aforementioned one of the plurality of laser scanning optical systems and the aforementioned another one of the plurality of laser scanning optical systems are composed of the same optical elements. Preferably, the optical elements include a laser beam emitter, a polygon mirror, an fθ lens and a condenser lens Preferably, the aforementioned one of the plurality of laser scanning optical systems and the aforementioned another one of the plurality of laser scanning optical systems are arranged in parallel to each other.

Preferably, the aforementioned one of the plurality of laser scanning optical systems and the aforementioned another one of the plurality of laser scanning optical systems are each provided with a polygon mirror, the polygon mirrors rotating in opposite rotational directions.

According to another aspect of the present invention, there is provided a cascade scanning optical system which includes a pair of laser scanning optical systems each emitting a laser beam to scan a photoconductive surface of a drum, and a beam splitter positioned such that a first laser beam passed through the beam splitter and a second laser beam reflected by the beam splitter proceed to the photoconductive surface on a common line thereon extending in an axial direction of the drum in respective ranges of the common line, wherein each of the pair of laser scanning optical systems is a telecentric system through which the first and second laser beams are incident on the photoconductive surface in a direction perpendicular to the axial direction of the drum The present disclosure relates to subject matter contained in Japanese Patent Application No. 8-224083 (filed on Aug. 26, 1996) which is expressly incorporated herein by reference in its entirety.

BRIEF DESCRIPTION OF THE DRAWINGS

The invention will be described below in detail with reference to the accompanying drawings, in which similar reference numerals indicate similar parts, and wherein.

DESCRIPTION OF THE PREFERRED EMBODIMENTS

FIGS. 1 through 4 show a first embodiment of a cascade scanning optical system for scanning the photoconductive surface of a photoconductive drum (rotating member) 10 provided in a laser-beam printer. The cascade scanning optical system is provided with a pair of laser scanning optical systems i.e., a first scanning optical system 20A and a second scanning optical system 20B. The first and second scanning optical systems 20A and 20B are provided with the same optical elements or parts, that is, the first scanning optical system 20A is provided with a laser beam emitter 21A, a polygon mirror 22A, an fθ lens group 23A and a condenser lens 24A, while the second scanning optical system 20B is provided with a laser beam emitter 21B, a polygon mirror 22B, an fθ lens group 23B and a condenser lens 24B. Each of the fθ lens groups 23A and 23B consists of two lens elements as can be seen from FIG. 1 or FIG. 2 The laser beam emitted from the laser beam emitter 21A to be deflected by the polygon mirror 22A and the laser beam emitted from the laser beam emitter 21B to be deflected by the polygon mirror 22B, scan respective different surfaces adjacent to each other on the photoconductive surface of the drum 10 on a common line extending in the axial direction of the drum 10. Namely, a half of a scanning line formed on the photoconductive surface of the drum 10 is scanned by the laser beam emitted from the laser beam emitter 21A and the other half of the scanning line formed on the photoconductive surface of the drum 10 is scanned by the laser beam emitted from the laser beam emitter 21B, as can be seen from FIG. 1.

The first and second scanning optical systems 20A and 20B are respectively supported by casings 25A and 25B which are arranged in parallel to each other and apart from each other both in a vertical direction (the vertical direction as viewed in FIG. 3) and also in the axial direction of the drum 10. Further, the casings 25A and 25B are arranged at different positions in the horizontal direction as viewed in FIG. 3.

Figure 2:
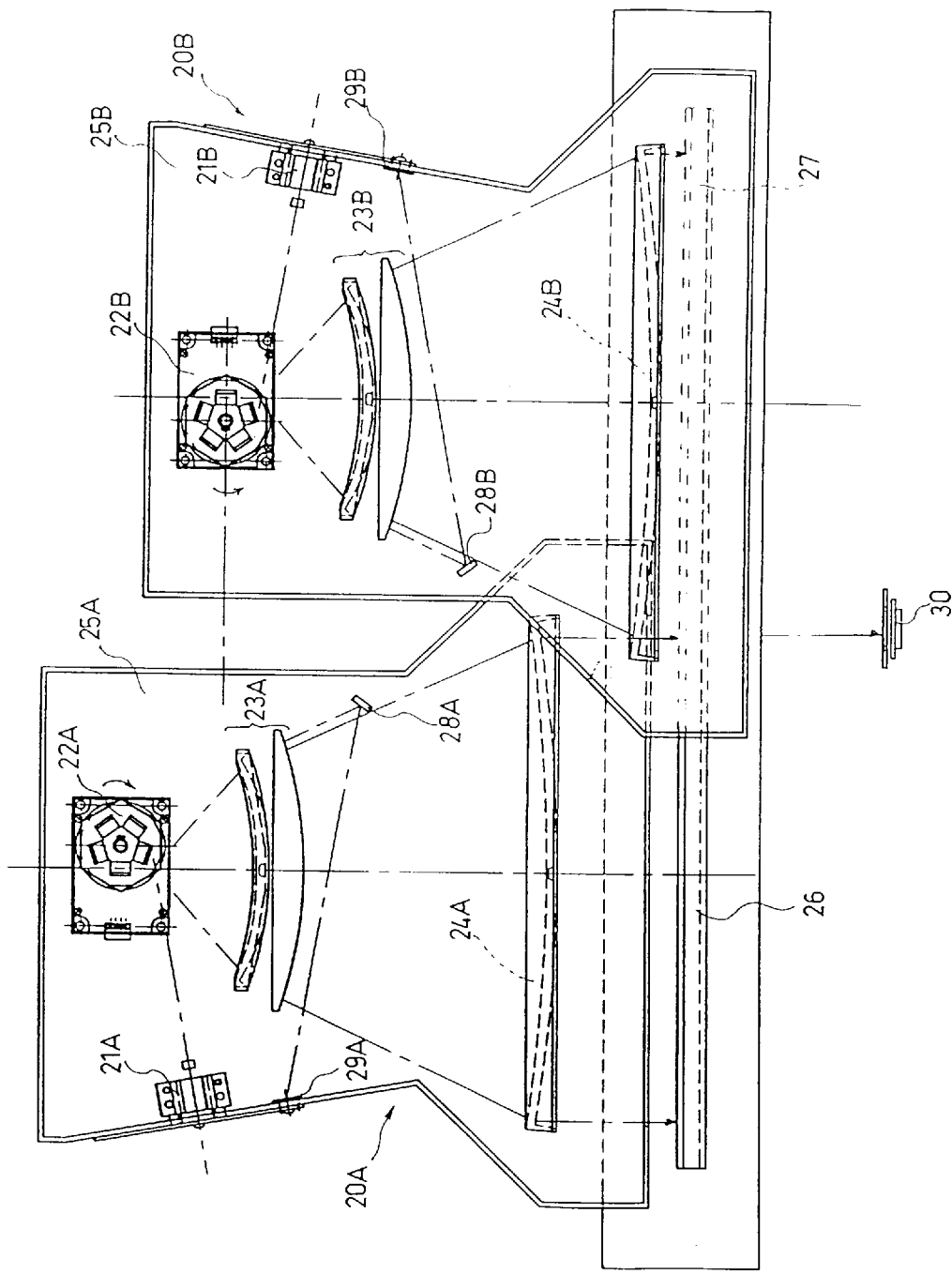
FIG. 2 is a plan view of the cascade scanning optical system shown in FIG. 1.

There is provided an elongated fixed half mirror 26 serving as a beam splitter which extends along the first and second scanning optical systems 20A and 20B in the main scanning direction (right and left direction as viewed in FIG. 2). The half mirror 26 is positioned in front of the condenser lens 24A to be angled relative to an optical path of the laser beam between the condenser lens 24A and the half mirror 26 by approximately 45°, so that the laser beam emitted from the condenser lens 24A is incident on one side of the half mirror 26 (the first side). The laser beam emitted from the condenser lens 24A is directly incident upon the half mirror 26, and part of the incident laser beam passes through the half mirror 26 while the remaining part is reflected by the half mirror 26 to be incident on the photoconductive surface of the drum 10.

There is provided a fixed elongated mirror 27 which extends in parallel to the half mirror 26 in the main scanning direction and is positioned above the half mirror 26 in front of the condenser lens 24B to be angled relative to an optical path of the laser beam between the condenser lens 24B and the mirror 27 by approximately 45°, so that the laser beam reflected by the mirror 27 is incident on the other side of the half mirror 26 (the second side). The laser beam emitted from the condenser lens 24B is directly incident upon the mirror 27 to be totally reflected thereby to enter the half mirror 26. The laser beam emitted from the condenser lens 24B to be totally reflected by the mirror 27 is incident upon the half mirror 26 in a direction orthogonal to the laser beam emitted from the condenser lens 24A (i.e., the laser beam emitted from the first scanning optical system 20A) to the half mirror 26. The mirror 27 is supported by the casing 25B while the half mirror 26 is supported by a supporting member (not shown) fixed relative to both the casings 25A and 25B.

Figure 1:
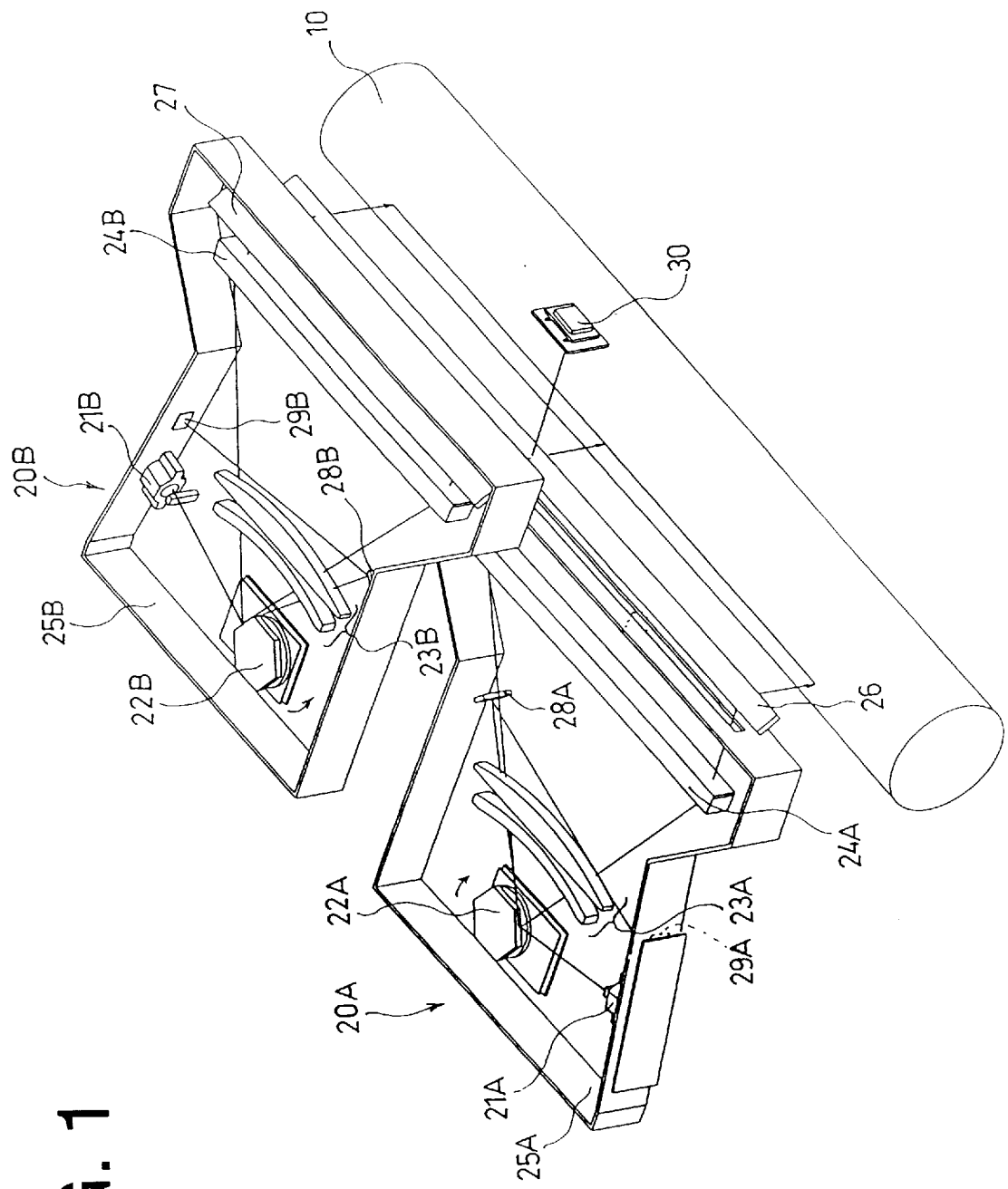
FIG. 1 is a perspective view of a first embodiment of cascade scanning optical system to which the present invention is applied, showing only fundamental elements thereof.

As shown in FIG. 1, the length of the mirror 27 is sufficient to receive the laser beam emitted from the condenser lens 24B, while the length of the half mirror 26 is much longer than that of the mirror 27, approximately double the length of the mirror 27, to receive both laser beams emitted from the first and second scanning optical systems 20A and 20B.

The laser beam emitted from the laser beam emitter 21A to be subsequently deflected by the polygon mirror 22A, is converged by the fθ lens group 23A in the main and sub-scanning directions. This converged laser beam is then collimated by the condenser lens 24A to be a collimated laser beam which extends in parallel to the shortest optical path between the fθ lens group 23A and the condenser lens 24A under the condition that "θ" is equal to zero (θ=0) in the equation "y=fθ", which shows the fθ lens characteristic. This collimated laser beam is incident upon the half mirror 26.

Similarly, the laser beam emitted from the laser beam emitter 21B to be subsequently deflected by the polygon mirror 22B is converged by the fθ lens group 23B in the main and sub-scanning directions. This converged laser beam is then collimated by the condenser lens 24B to be a collimated laser beam which extends in parallel to the shortest optical path between the fθ lens group 23B and the condenser lens 24B under the condition that "θ" is equal to zero (θ=0) in the equation "y=fθ", which shows the fθ lens characteristic. This collimated laser beam is incident upon the mirror 27.

According to the above arrangement, the laser beam emitted from the condenser lens 24A to be partly reflected by the half mirror 26 and the other laser beam emitted from the condenser lens 24B to be reflected by the mirror 27 and partly passed through the half mirror 26, each proceed in a common plane to be always incident upon the photoconductive surface of the drum 10 in a direction perpendicular to a rotational axis 10a of the drum 10 (i.e., in a direction perpendicular to the axial direction of the drum 10), specifically in a direction orthogonal to generatrices of the drum 10, and accordingly, each of the first and second scanning optical systems 20A and 20B is a telecentric system.

Accordingly, the scanning laser beam emitted from the first scanning optical system 20A and the other scanning laser beam emitted from the second scanning optical system 20B are each projected onto the photoconductive surface of the drum 10 through the half mirror 26 and the mirror 27 on a common line extending in the axial direction of the drum 10 in respective different adjacent ranges of the common line to thereby form a straight and continuous wide scanning line on the photoconductive surface of the drum 10.

The polygon mirror 22A rotates in a clockwise direction while the polygon mirror 22B rotates in a counterclockwise direction, as viewed in FIG. 2. Namely, the polygon mirrors 22A and 22B rotate in opposite rotational directions to scan the photoconductive surface of the drum 10 from its approximate center toward respective opposite ends in opposite directions. A mirror 28A is fixedly provided in the casing 25A at a position to receive the scanning laser beam emitted from the fθ lens group 23A before the scanning laser beam is incident on the photoconductive surface of the drum 10 through the half mirror 26 at each scanning sweep while the polygon mirror 22A rotates. The laser beam reflected by the mirror 28A is incident on a laser beam detector 29A fixedly provided in the casing 25A at a position opposite to the mirror 28A. Likewise, a mirror 28B is fixedly provided in the casing 25B at a position to receive the scanning laser beam emitted from the fθ lens group 23B before the scanning laser beam is incident on the photoconductive surface of the drum 10 through the mirror 27 and the half mirror 26 at each scanning sweep while the polygon mirror 22B rotates. The laser beam reflected by the mirror 28B is incident on a laser beam detector 29B fixedly provided in the casing 25B at a position opposite to the mirror 28B. A laser beam detector 30 for determining a border between the first and second scanning optical systems 20A and 20B is fixedly provided in front of the half mirror 26, i.e. on the lower side thereof as viewed in FIG. 2, at a position to correspond to opposing ends of the condenser lenses 24A and 24B, those ends opposing to each other in a vertical direction as viewed in FIG. 2.

Figure 3:
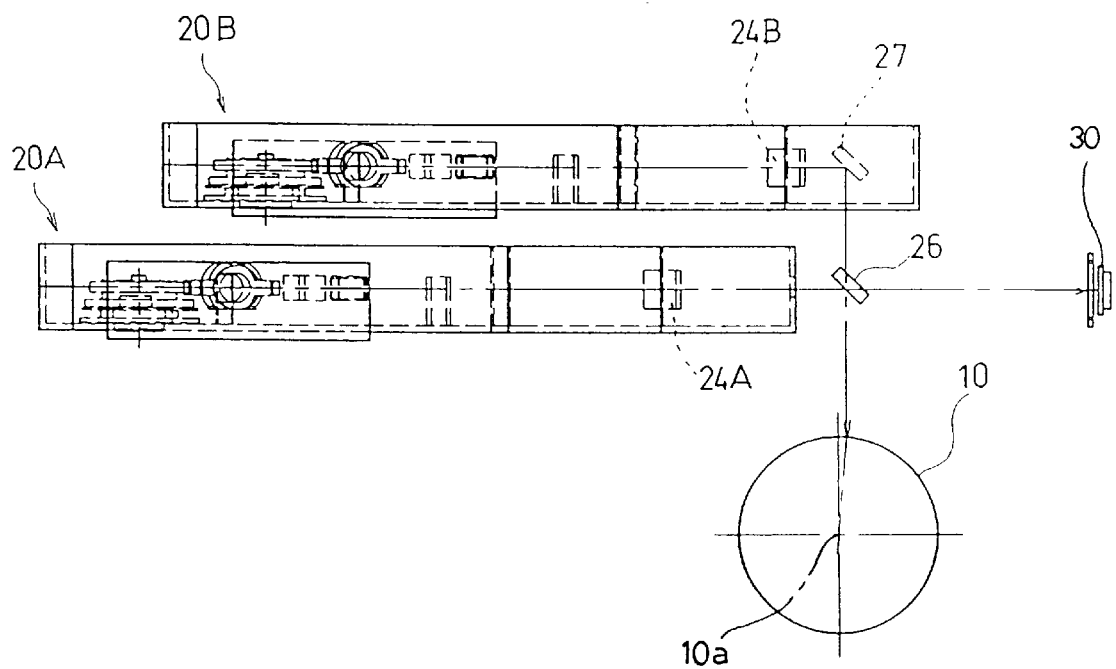
FIG. 3 is a side view of the cascade scanning optical system shown in FIG. 2, as viewed from the left of FIG. 2.
Figure 4:
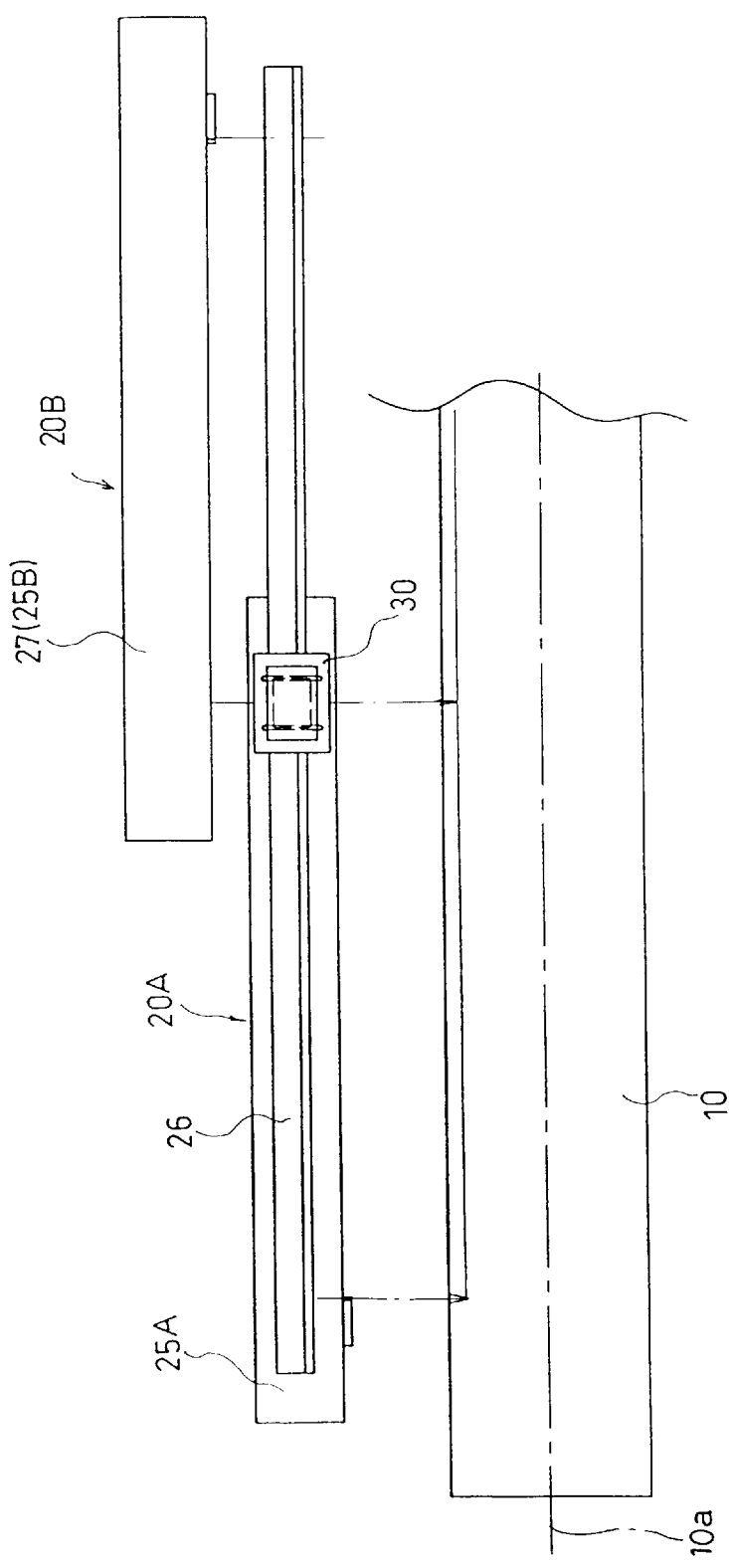
FIG. 4 is a front view of the cascade scanning optical system shown in FIG. 2, as viewed from the lower side of FIG. 2.

As shown in FIG. 3, the laser beam emitted from the condenser lens 24A to be partly passed through the half mirror 26 and also the laser beam emitted from the condenser lens 24B reflected by the mirror 27 to be partly reflected by the half mirror 26 are each incident upon the laser beam detector 30 immediately before each of the laser beams is incident on the respective different adjacent ranges of the common line on the photoconductive surface of the drum 10.

The laser beam emitters 21A and 21B are each controlled to turn its laser emission ON or OFF in accordance with given image data to draw a corresponding image (charge-latent image) on the photoconductive surface of the drum 10, and subsequently, this image drawn on the photoconductive surface of the drum 10 is transferred to plain paper according to a conventional electrophotographic method.

According to the first embodiment of the cascade scanning optical system, the polygon mirrors 22A and 22B are controlled synchronously with the use of the laser beam detectors 29A, 29B and 30 such that the scanning starting point of a spot of the scanning laser beam emitted from the first scanning optical system 20A is properly and precisely adjacent to the scanning starting point of a spot of the scanning laser beam emitted from the second scanning optical system 20B on the photoconductive surface of the drum 10, and that the two spots move in opposite directions apart from each other in the main scanning direction to thereby form a wide scanning line on the photoconductive surface of the drum 10. With the rotational movement of the photoconductive drum 10, which is synchronized to the rotational movement of each polygon mirror 22A, 22B, a series of wide scanning lines are made on the photoconductive surface of the drum 10 to thereby obtain a certain image (charge-latent image) on the photoconductive surface of the drum 10.

As mentioned above, according to the first embodiment of the cascade scanning optical system, the pair of scanning laser beams emitted respectively from the first and second scanning optical systems 20A and 20B are each incident on the photoconductive surface of the drum 10 in a direction orthogonal to generatrices of the photoconductive drum 10 at all times, wherever the spot of each scanning laser beam is on a scanning line in a corresponding range thereof Therefore, even if the photoconductive surface of the drum 10 deviates from its original position in a direction close to or away from the first and second scanning optical systems 20A and 20B, the opposing ends of two corresponding scanning lines formed by the pair of scanning laser beams emitted from the first and second scanning optical systems 20A and 20B will not be apart from each other or overlap each other. Furthermore, the pair of scanning laser beams emitted from the first and second scanning optical systems 20A and 20B are incident on the photoconductive surface of the drum 10 in the same direction without any inclination therebetween, so that each of the opposing ends of the two corresponding scanning lines formed by the pair of scanning laser beams will not deviate from the other of the opposing ends in the sub-scanning direction even if the photoconductive drum 10 deviates from its original position in a direction close to or away from the first and second scanning optical systems 20A and 20B.

Figure 5:
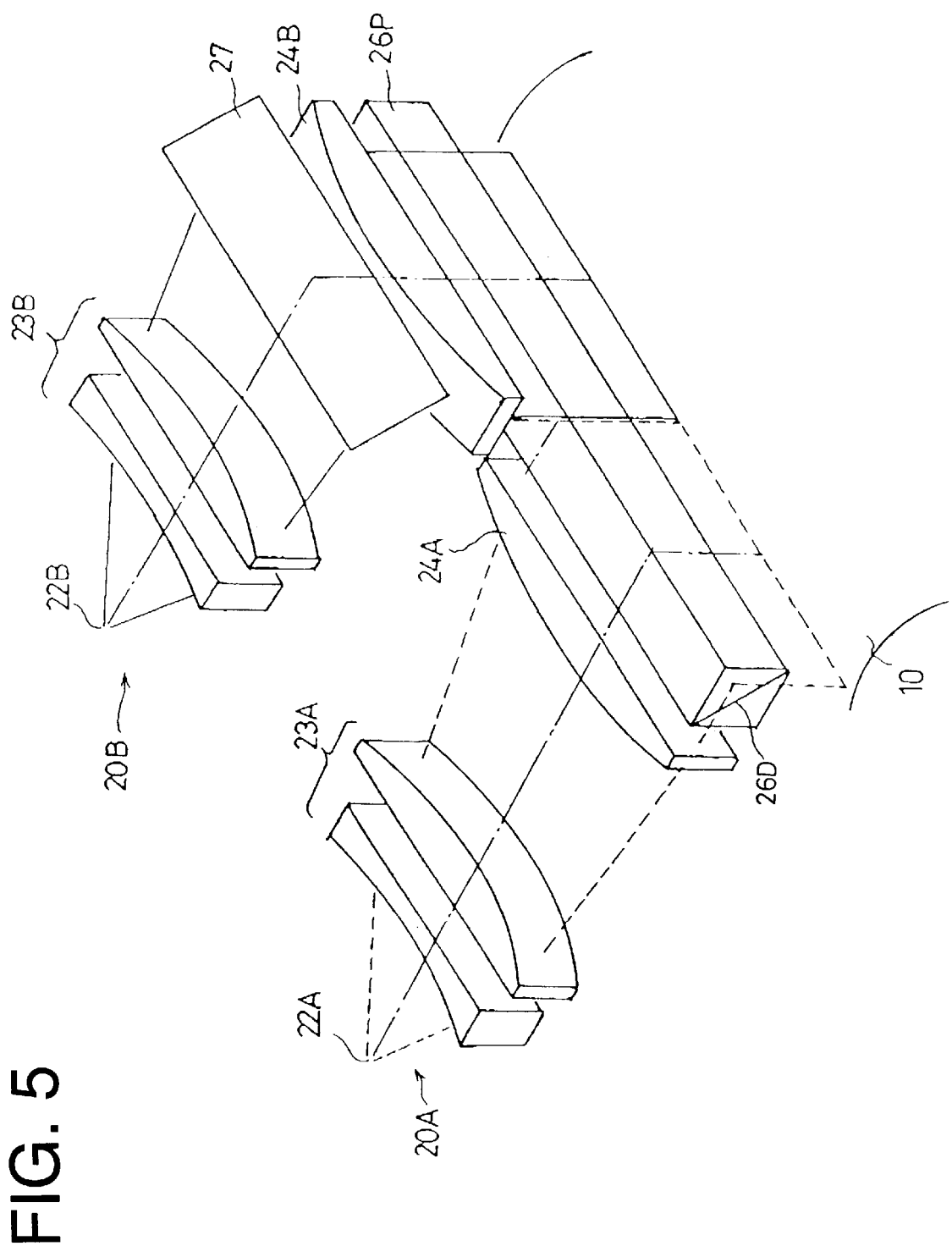
FIG. 5 is a perspective view of a second embodiment of a cascade scanning optical system to which the present invention is applied, showing only fundamental elements thereof.

FIG. 5 shows a second embodiment of the cascade scanning optical system for scanning the photoconductive drum 10. This second embodiment is substantially identical to the first embodiment except that the respective positions of the condenser lens 24B and the mirror 27 are changed so as to position the mirror 27 above the condenser lens 24B, and that the half mirror 26 of the first embodiment is replaced by a prism 26P serving as a polarization beam splitter (PBS)

An The prism 26P is provided with a polarizing face 26D for reflecting one of p-polarized light and s-polarized light while allowing the other to pass therethrough. It will be appreciated from such arrangements that the cascade scanning optical system of this second embodiment can obtain similar effects to those of the first embodiment by employing an arrangement in which one of the scanning laser beams emitted from the first and second scanning optical systems 20A and 20B is rendered to be a p-polarized laser beam while the other is rendered to be an s-polarized laser beam. In this second embodiment, it is not necessary to provide a laser beam detector similar to the laser beam detector 30 used in the first embodiment.

In either embodiment as noted above, the laser scanning optical systems 20A and 20B may be controlled in synchronization with each other so as to synchronize the phase of respective scanning laser beams by using any device. Namely, although the laser beam detector 29A, 29B and 30 are used as elements for synchronizing the phase, any other conventional members or devices for synchronizing the phase may be used instead of the detector 29A, 29B and 30.

In either embodiment as noted above, although only one pair of laser scanning optical systems 20A and 20B are used to form a wide scanning line, more than one pair of laser scanning optical systems may be arranged in series in the main scanning direction to form a wider scanning line.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A cascade scanning optical system, comprising:
    a plurality of laser scanning optical systems each emitting a laser beam to scan a surface of a member; and
    a beam splitter positioned in an optical path between said plurality of laser scanning optical systems and said member such that a first laser beam passed through said beam splitter and a second laser beam reflected by said beam splitter proceed to said surface on a common line thereon in respective ranges of said common line,
    wherein each of said plurality of laser scanning optical systems comprises a telecentric system.

2. The cascade scanning optical system according to claim 1, wherein said member comprises a drum having said surface on a periphery of said drum,
    wherein said beam splitter is positioned in said optical path such that said first laser beam and said second laser beam proceed to said surface on said common line on said surface extending in an axial direction of said drum in said respective ranges of said common line, and
    wherein said first laser beam and said second laser beam are incident on said surface in a direction perpendicular to said axial direction of said drum.

3. The cascade scanning optical system according to claim 1, further comprising a mirror positioned adjacent to said beam splitter to reflect a laser beam emitted from one of said plurality of laser scanning optical systems toward one side of said beam splitter in a first direction,
    wherein another one of said plurality of laser scanning optical systems is positioned such that a laser beam is emitted therefrom towards another side of said beam splitter in a second direction perpendicular to said first direction.

4. The cascade scanning optical system according to claim 3, wherein said one of said plurality of laser scanning optical systems and said another one of said plurality of laser scanning optical systems comprise of the same optical elements.

5. The cascade scanning optical system according to claim 4, wherein said optical elements comprise a laser beam emitter, a polygon mirror, an fθ lens and a condenser lens.

6. The cascade scanning optical system according to claim 3, wherein said one of said plurality of laser scanning optical systems and said another one of said plurality of laser scanning optical systems are arranged in parallel to each other.

7. The cascade scanning optical system according to claim 3, wherein said one of said plurality of laser scanning optical systems and said another one of said plurality of laser scanning optical systems are each provided with a polygon mirror, said polygon mirrors rotating in opposite rotational directions.

8. A cascade scanning optical system, comprising:
    a pair of laser scanning optical systems, each laser scanning optical system of said pair of laser scanning optical systems emitting a laser beam to scan a photoconductive surface of a drum; and
    a beam splitter positioned such that a first laser beam passed through said beam splitter and a second laser beam reflected by said beam splitter proceed to said photoconductive surface on a common line on said surface extending in an axial direction of said drum in respective ranges of said common line,
    wherein each of said pair of laser scanning optical systems comprise a telecentric system through which said first laser beam and said second laser beam pass and are incident on said photoconductive surface in a direction perpendicular to said axial direction of said drum.

* * * * *

UNITED STATES PATENT AND TRADEMARK OFFICE
CERTIFICATE OF CORRECTION

PATENT NO. : 5,867,299
DATED : February 2, 1999
INVENTOR(S) : M. TAKANO, et al.

It is certified that error appears in the above-identified patent and that said Letters Patent is hereby corrected as shown below:

At column 7, line 58 (claim 1, line 9) of the printed patent, change "thereon" to ---on said surface---.

At column 8, line 27 (claim 4, line 4) of the printed patent, delete "of".

On the cover page, at line 10 of the abstract, change "desinged" to ---designed---.